June 13, 1950 G. E. STILWELL 2,511,020
CRATE MAKING MACHINE
Filed Dec. 13, 1947 8 Sheets-Sheet 1

GLENN E. STILWELL
INVENTOR.
BY
ATTORNEY

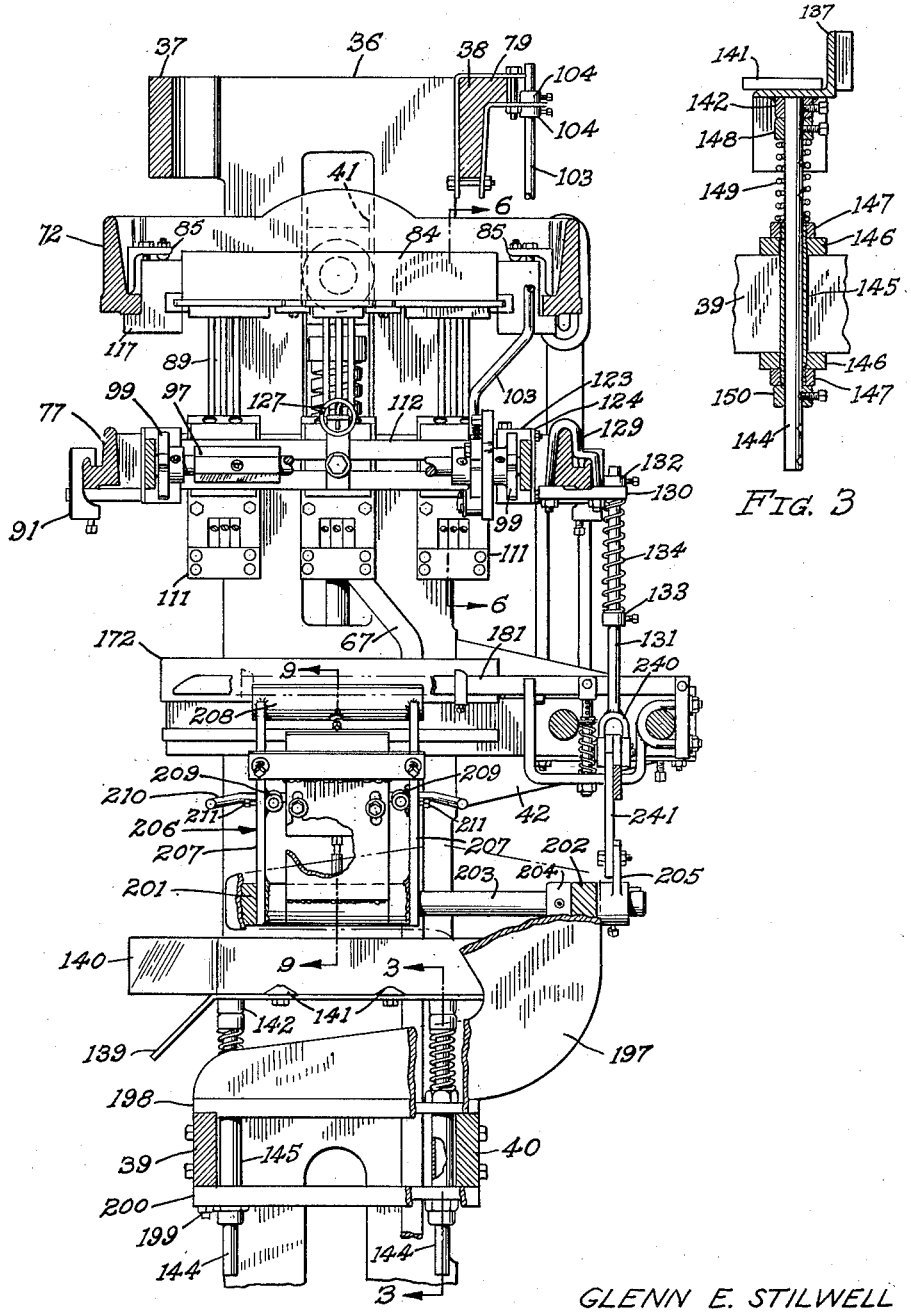

June 13, 1950  G. E. STILWELL  2,511,020
CRATE MAKING MACHINE
Filed Dec. 13, 1947  8 Sheets-Sheet 3
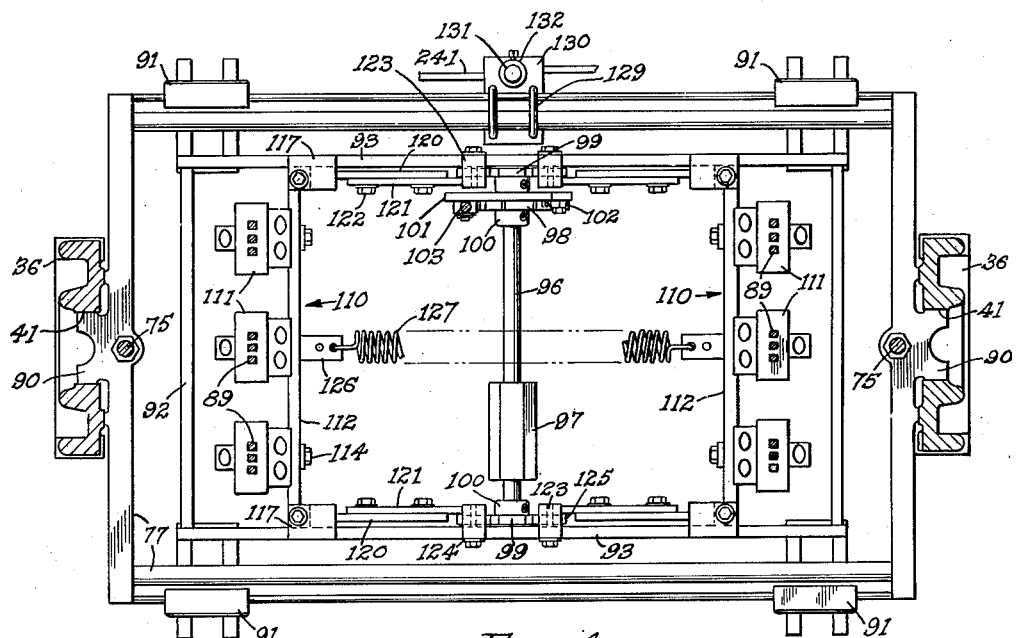
FIG. 4
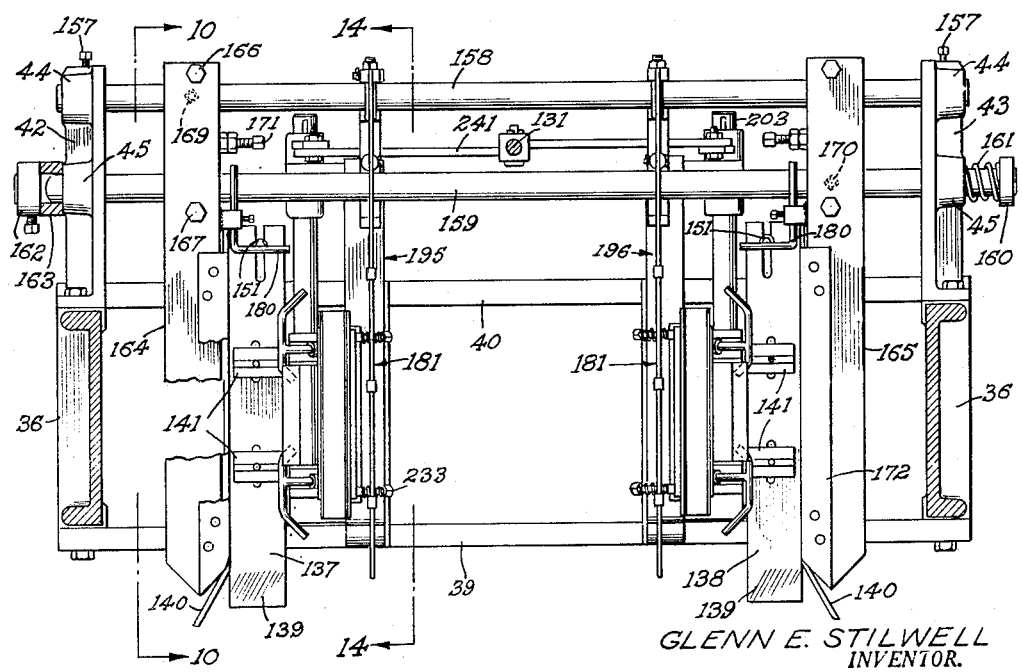
FIG. 5
GLENN E. STILWELL
INVENTOR.
BY 
ATTORNEY

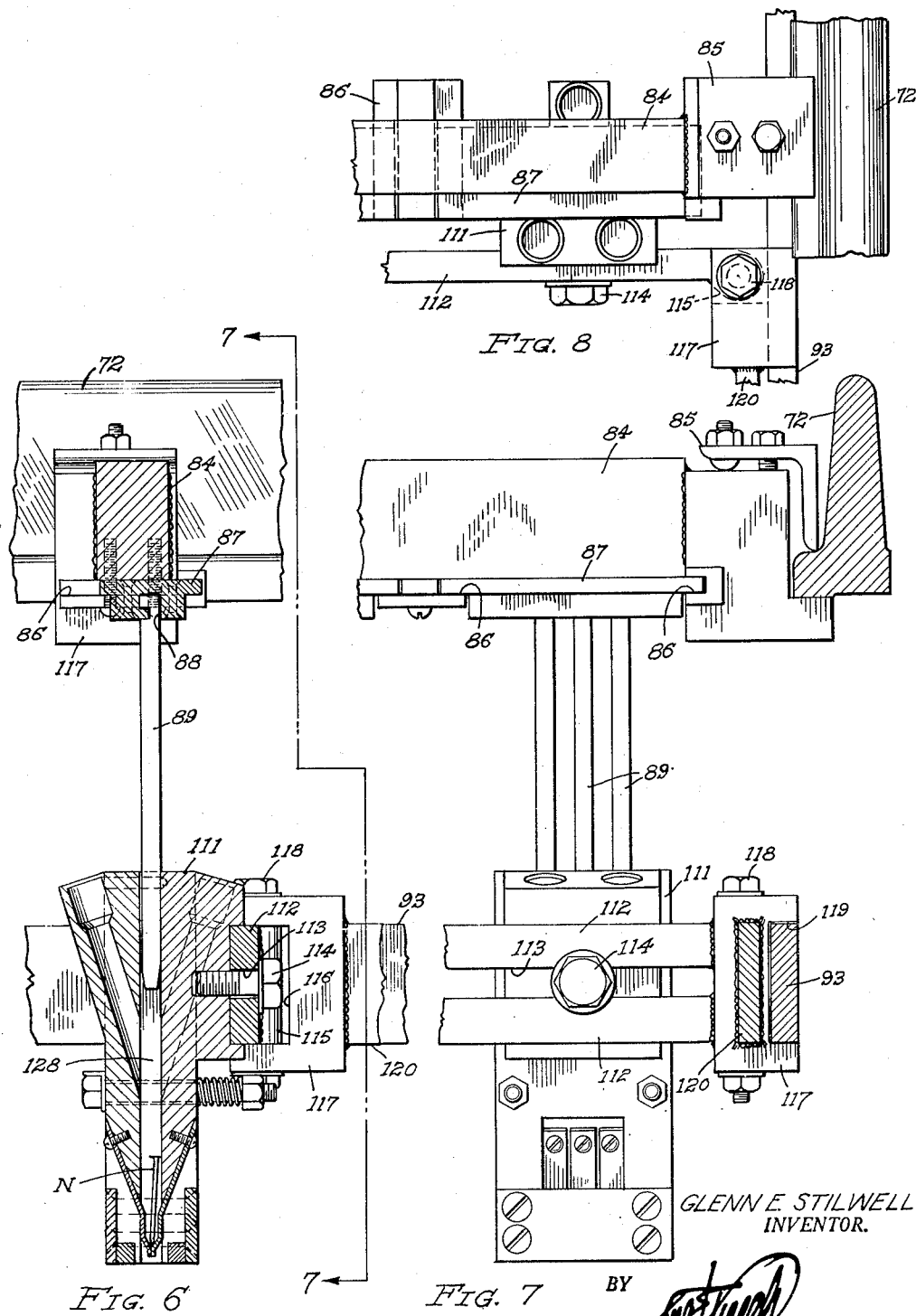

June 13, 1950     G. E. STILWELL     2,511,020
CRATE MAKING MACHINE

Filed Dec. 13, 1947     8 Sheets-Sheet 5

GLENN E. STILWELL
INVENTOR.

BY
ATTORNEY

June 13, 1950  G. E. STILWELL  2,511,020
CRATE MAKING MACHINE
Filed Dec. 13, 1947  8 Sheets-Sheet 6
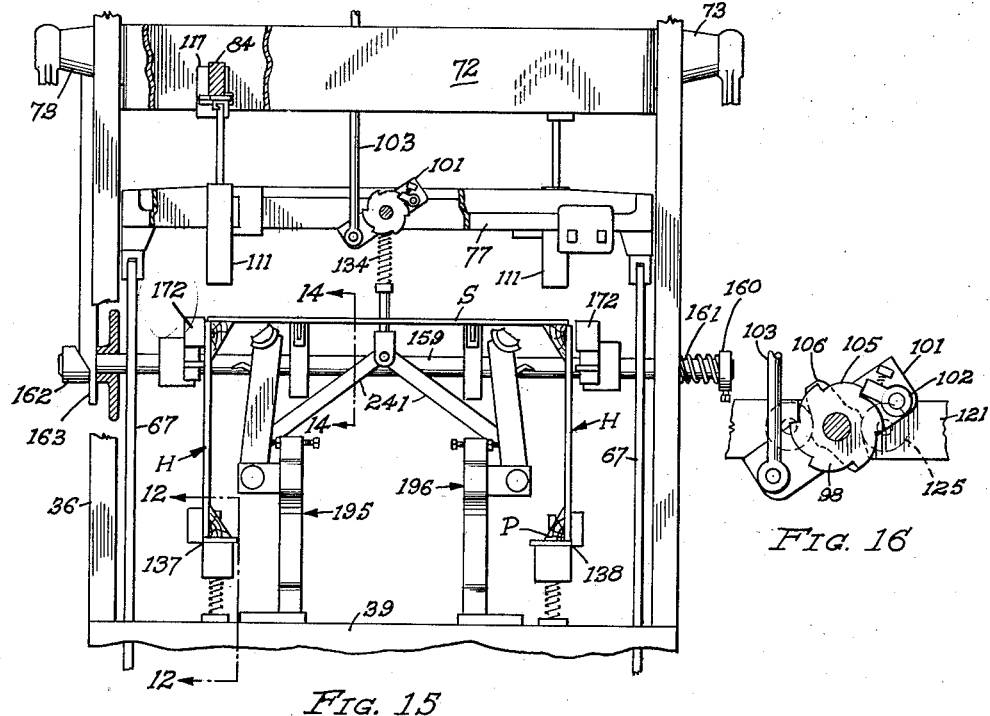
FIG. 15
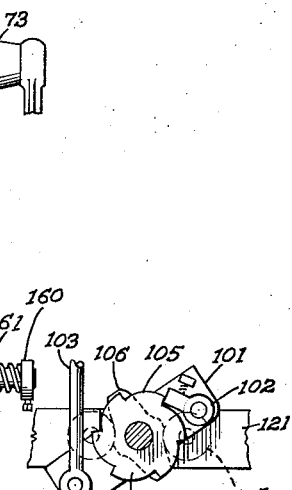
FIG. 16
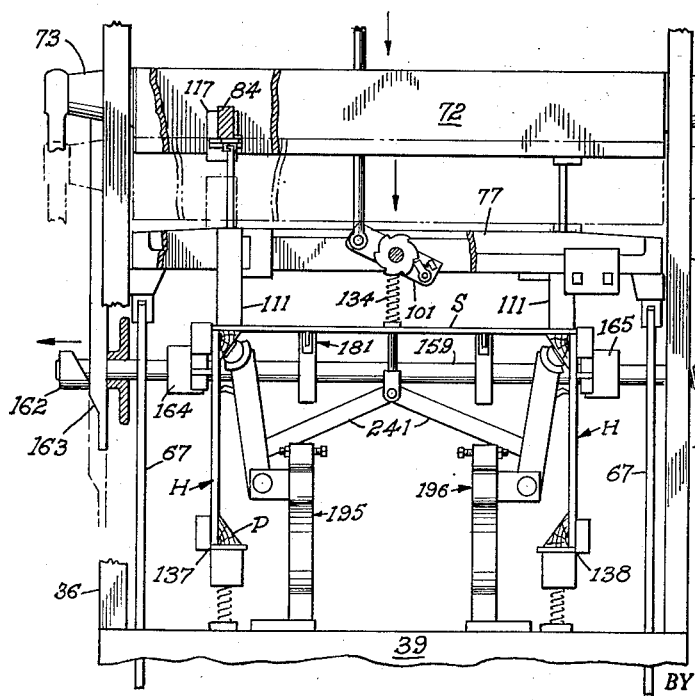
FIG. 17
FIG. 18
GLENN E STILWELL
INVENTOR.
BY 
ATTORNEY June 13, 1950 G. E. STILWELL 2,511,020
CRATE MAKING MACHINE
Filed Dec. 13, 1947 8 Sheets-Sheet 7

GLENN E. STILWELL
INVENTOR.

BY
ATTORNEY

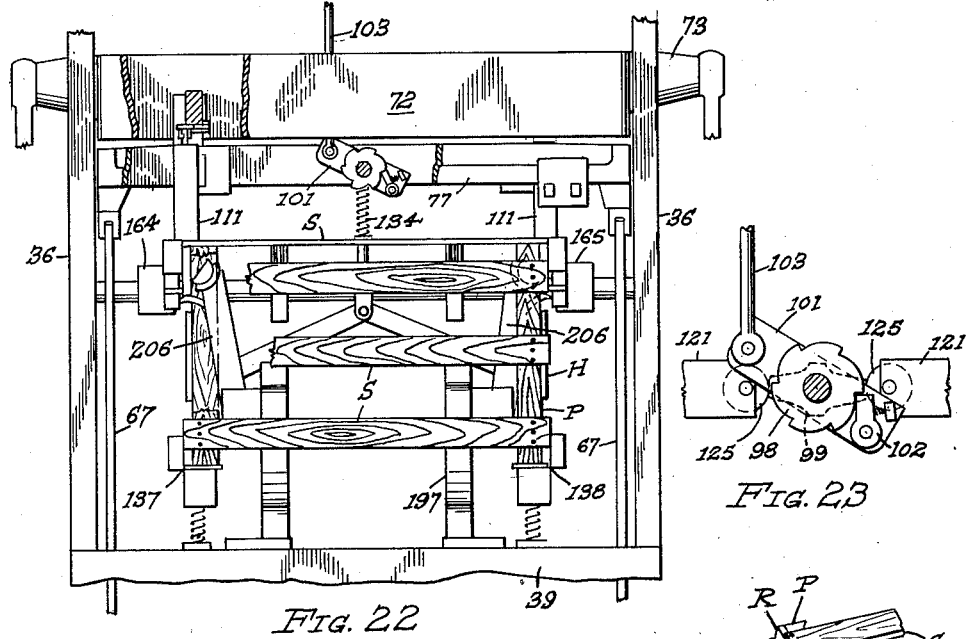
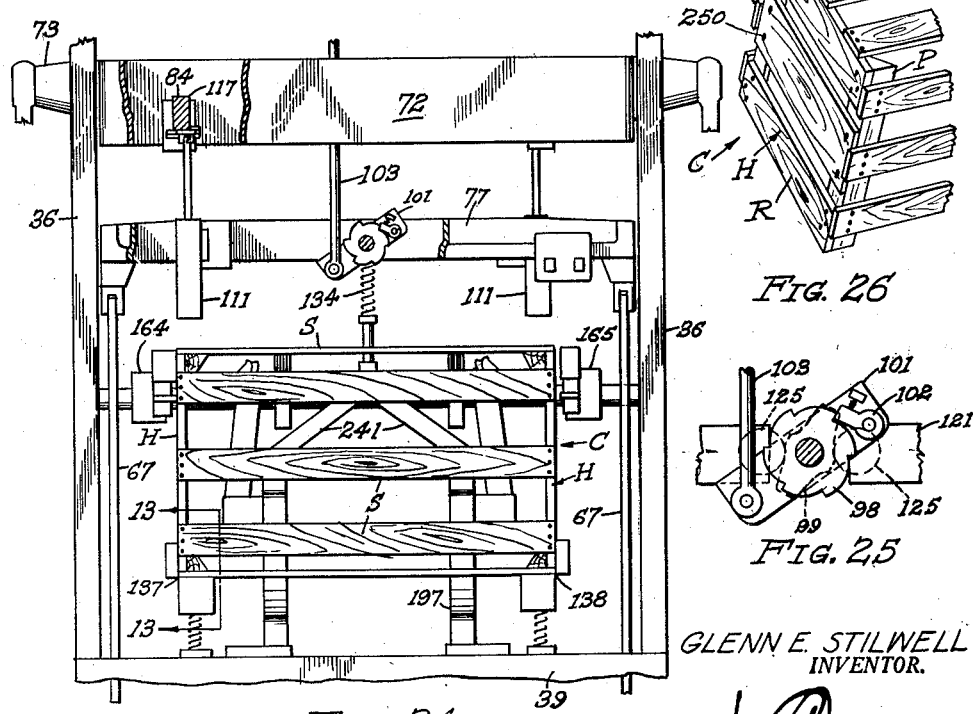

Patented June 13, 1950

2,511,020

UNITED STATES PATENT OFFICE 2,511,020

CRATEMAKING MACHINE

Glenn E. Stilwell, Riverside, Calif., assignor to Food Machinery and Chemical Corporation, San Jose, Calif., a corporation of Delaware Application December 13, 1947, Serial No. 791,600

9 Claims. (Cl. 1—10)

This invention relates to box making machines and is particularly useful in the making of cantaloupe crates.

Each head of a cantaloupe crate is fabricated from a pair of posts, a pair of rails, and a cross panel, the posts having a triangular cross section, to eliminate the sharp corners which the posts would otherwise present to the cantaloupes and which would damage the cantaloupes.

It is an object of the invention to provide an improved machine for making cantaloupe crates.

The box making machine shown in U. S. Letters Patent to H. E. Twomley, No. 1,978,613, issued October 30, 1934, is known commercially as an "ACC" machine. It represents a conversion of what is commercially known as an AC machine to adapt this, by the addition thereto of certain attachments, for the making of cantaloupe crates.

While the ACC machine has given satisfaction in its service as a cantaloupe crate maker, there are many owners of AC machines who would like to adapt them to the making of cantaloupe crates without converting the machine permanently into an ACC machine and without going to the considerable cost involved in making such a conversion.

It is another object of the present invention therefore, to provide a set of attachments by which an AC box making machine may be converted relatively inexpensively into a cantaloupe crate maker.

Still another object of the invention is to provide a relatively simple semi-automatic multiple drive crate maker.

In the making of cantaloupe crates, the nails by which the side slats are nailed to the posts of the crate heads are driven along lines at the opposite ends of the crate, which lines are spaced inwardly from the lines along which the nails are driven in nailing the bottom slats to the lower rails of the crate heads. Provision must be made, therefore, in a nailing machine for making cantaloupe crates or the like, for driving the nails at the opposite ends of the machine, in successive nailing operations, in the making of a crate, along lines spaced different distances laterally from the center of the machine.

It is a further object of the invention to provide in a crate making machine, a novel mechanism for causing rows of nails driven in multiples at opposite ends of the crate to be spaced differently from the center of the machine in successive nailing operations.

In the ACC machine above referred to, banks of double nail chucks are provided along opposite sides of the machine and nails selectively fed to the inner and outer divisions of said chucks in successive nailing operations to accomplish the proper spacing of the rows of nails from the center of the machine.

These double chucks are relatively expensive to build and it is a yet further object of the present invention to accomplish with single chucks the function for which said double chucks are provided in the ACC machine.

The manner of accomplishing the foregoing objects as well as further objects and advantages will be made manifest in the following description taken in connection with the accompanying drawings in which:

Fig. 2 is a vertical sectional view at an enlarged scale taken on the line 2—2 of Fig. 1.

Fig. 3 is a vertical sectional detail view at an enlarged scale taken on the line 3—3 of Fig. 2.

Fig. 4 is a horizontal sectional view at an enlarged scale taken on the line 4—4 of Fig. 1.

Fig. 5 is a horizontal sectional view on the same scale as Fig. 4 and taken on the line 5—5 of Fig. 1.

Fig. 6 is a vertical sectional view at an enlarged scale taken on the line 6—6 of Fig. 2 and illustrating one of the nail chucks and punches of the invention.

Fig. 7 is a cross-sectional view taken on the line 7—7 of Fig. 6.

Fig. 8 is a plan view of Fig. 7.

Fig. 15 is a diagrammatic fragmentary front elevational view of the invention illustrating the relative positions of the principal working parts thereof at the commencing of the making of a crate and with two crate heads and the slats of the first side in the positions in which these are placed manually in the machine.

Fig. 16 is an enlarged view of the chuck shifting mechanism as shown in Fig. 15.

Fig. 17 is a view similar to Fig. 15 and illustrates the nailing of the slats of the first side onto the crate heads with the chucks resting against the slats and with the chuck index arm rocked into a position of readiness to shift the chuck banks outwardly when the chucks rise.

Fig. 18 is an enlarged view of the chuck shifting mechanism as shown in Fig. 17.

Fig. 22 is a view similar to Fig. 21 and shows the chucks and nail driver head in their lowermost positions during the nailing of the bottom onto the crate and showing the rocking of the chuck indexing arm into a position of readiness to cause the chuck banks to be shifted inwardly upon the lifting of the chucks as this nailing operation is completed.

Fig. 23 is an enlarged view of the chuck shifting mechanism as this appears in Fig. 22.

Fig. 24 is a view similar to Fig. 22 and illustrates the appearance of the work in the machine at the commencing of the nailing of the slats of the second side onto the crate.

Fig. 25 is an enlarged view of the chuck shifting mechanism as this appears in Fig. 24.

Fig. 26 is a perspective view of one end of the cantaloupe crate for the manufacture of which the invention is particularly adapted, and shows how the lines of nails securing the bottom slats to the rails are spaced outwardly from the lines of nails securing the side slats to the posts.

Figure 1:
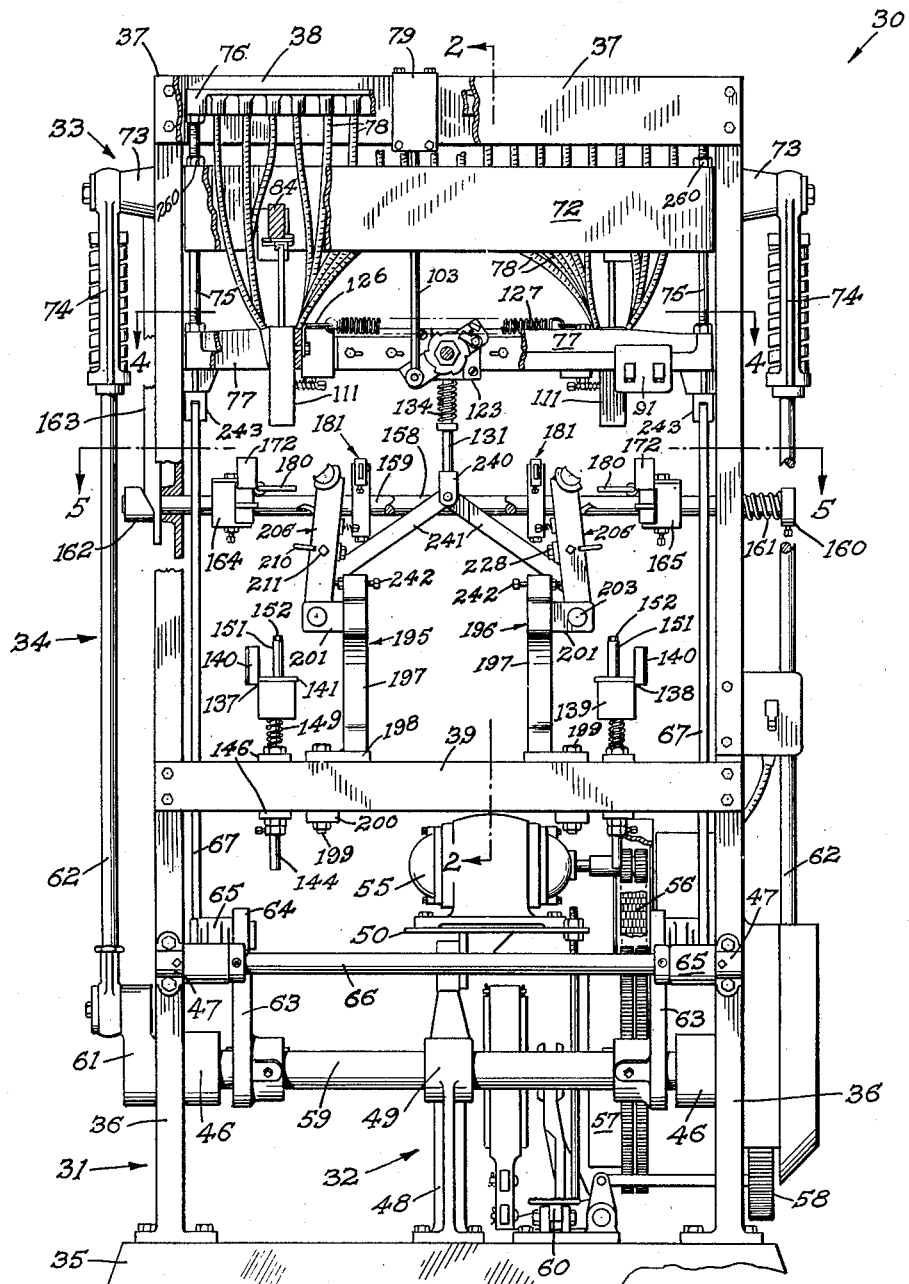
Fig. 1 is a front elevational view of a preferred embodiment of the invention with portions thereof broken away to disclose hidden elements of the structure.

Referring specifically to the drawings, the preferred embodiment of the invention illustrated therein comprises a box making machine 30 which includes a frame 31, a drive mechanism 32, a nailing mechanism 33, and a work supporting and aligning mechanism 34.

The frame includes a base 35, side standards 36, a front top cross tie 37, a rear top cross tie 38, a front work table cross tie 39, and a rear work table cross tie 40.

The standards 36 have slide ways 41. They also have brackets 42 and 43 extending rearwardly therefrom (see Figs. 2 and 5), these brackets having bearings 44 and 45. Standards 36 also provide bearings 46 and 47. Also provided on the base 35 is a short motor standard 48 having a bearing 49 and a motor platform 50.

The drive mechanism 32 includes a motor 55 mounted on the platform 50 which is connected by a chain 56 to a clutch 57 mounted on a shaft (not shown) having a pinion (not shown) which meshes with a master gear 58 on a crank shaft 59 which journals in bearings 46. When the clutch 57 is thrown in by depressing a foot pedal 60, the crank shaft 59 is rotated for a single revolution.

The shaft 59 has a crank 61 on the opposite end thereof from said master gear, pitmans 62 being pivotally connected to said crank and said master gear so as to be reciprocated by each rotation of the shaft 59.

Also mounted on the shaft 59 are chuck lifting cams 63 which are aligned with rollers 64 on rockers 65 fixed on a shaft 66 which journals in bearings 47. Extending upwardly from rockers 65 are links 67. The functions of links 67 will be made clear hereinafter.

The nailing mechanism 33 includes a rectangular driver head 72 having studs 73 which extend outwardly through and slide in the slide ways 41. Pitmans 62 have spring cushion units 74 at their upper ends which pivotally connect with the studs 73. Slideable in vertical holes provided in opposite ends of the head 72 are guide shafts 75 on the upper ends of which is mounted a nail tube support 76 and the lower end of which is secured to a rectangular chuck mounting frame 77.

The support 76 has a series of holes into which are secured the upper ends of flexible nail tubes 78. A suitable nail feed mechanism (not shown) is mounted on the rear frame tie 38 so as to deliver nails to each of the tubes 78 at the conclusion of each nailing operation. Fixed on the tie 38 is a clamp 79, the purpose of which will be made clear hereinafter.

Extending across the space inside the driver head 72 are a pair of driver bars 84, opposite ends of which have clamps 85 by which these bars are secured to the driver head 72. Provided along the bottom of each of the bars 84 are bayonet slots 86 in which punch racks 87 are mounted so as to be freely slideably laterally in said slots. Each punch rack 87 has an L-shaped slot 88 into which the upper ends of three nail punches 89, shaped to fit said slot, are slid in the assembly of the machine.

Referring now to Figs. 4, 6, and 7, the rectangular chuck mounting frame 77 has slides 90 which extend outwardly through the slide ways 41 and guide the frame 77 vertically. Supported by clamps 91 within the frame 77 is a rectangular adapter 92 having front and rear bars 93. Journaled centrally in bearing holes in said bars is a chuck shifting shaft 96 having fixed thereto a hand grip 97, a ratchet 98, cams 99, and spacing collars 100. Freely rotatable on this shaft, adjacent the ratchet 98, is a chuck index arm 101 having a dog 102, spring-loaded for engagement with the ratchet 98 and pivotally connected at its opposite end to the lower end of an actuating rod 103, the upper end of which extends through a hole in the clamp 79 and is adjustably secured therein by collars 104. The ratchet 98 has teeth 105 and the cams 99 have two lobes 106 spaced 180° apart.

Slideable on the bars 93 are two banks 110 of chucks 111, these chucks being secured to bars 112 which are separated by slots 113 and between which cap screws 114 extend to adjustably and rigidly position the chucks on these bars. Opposite ends of the bars 112 are welded to collars 115 which extend into openings 116 in clevis slide blocks 117 and are pivotally connected therewith by bolts 118. Each slide block 117 also has an opening 119 which slideably embraces an adjacent bar 93.

Welded to each block 117 is a pusher bar 120, each such bar being adjustably secured to a similar flat bar 121 by cap screws 122 passing through slots in the latter and screwed into suitable tapped holes in the bar 120.

Welded to the inner end of each of the bars 121 is a slide block 123 which slideably embraces adjacent bar 93 and is held in this relation by a strap 124 screwed to this block and resting against the outer face of this bar 93. Pivotally mounted within each block 123, on the adjacent end of the bar 121 so as to lie between this bar and adjacent bar 93, is a cam responsive roller 125 which is disposed in contact with one of the cams 99 and responsive thereto as these cams are turned by rotation of the shaft 96.

Secured to the middle of each chuck bank 110 by one of the cap screws 114 is a clip 126, opposite ends of a coiled spring 127 being connected to these clips so that the tension of this spring pulls the chuck banks inwardly to hold the rollers 125 snugly against the cams 99.

Each of the chucks 111 is designed, in the preferred embodiment disclosed, to deliver these nails during each nailing operation and is therefore provided with three nail channels 128 with each of which one of the tubes 78 connects and into each of which a punch 89 extends for the driving of a nail N downwardly therefrom during each nailing operation.

Applied to the middle of the back side of the rectangular frame 77 is a clamp 129 having an apertured base 130 through which a rod 131 extends, this being retained in place by a collar 132 and having another collar 133 for trapping a coiled spring 134 under tension between this collar and the clamp base 130.

The work supporting and aligning mechanism 34 includes right and left-hand box head guides 137 and 138 each of which is made of angle iron to have a downwardly inclined guide lip 139 and an outwardly inclined guide lip 140, each guide having lugs 141, the purpose of which will be made clear hereinafter.

Welded to the bottom of each of the guides 137 and 138 is a pair of collars 142 which are set onto the upper ends of rods 144 which extend downwardly through sleeves 145 which extend between ties 39 and 40, just inside these, and through holes in cross straps 146 disposed immediately above and beneath these ties, these sleeves being held rigidly in place by nuts 147 screwed onto the upper and lower ends of said sleeve.

Each rod 144 has a set collar 148 disposed just beneath the collar 142 and a guide supporting spring 149 is coiled about the rod between this collar and the upper nut 147. The upward limit of movement of the rods 144, in response to the springs 149, is fixed by set collars 150 provided on the rods 144 just beneath the lower of the nuts 147.

Each of these guides 137 and 138 has a rear head stop 151 which is affixed to the guide by a bolt 152 extending through a slot in the guide so as to have adjustment lengthwise of the guide.

Extending through the bearings 44 and fixed therein by set screws 157 is a shaft 158. Extending through bearings 45 and slideable therein is a shaft 159. Fixed on an extending end of the shaft 159, beyond the bracket 43, is a collar 160, a short expansion spring 161 being trapped between the bracket 43 and this collar.

Fixed on the opposite end of the shaft 159 is a dagger cam follower block 162, a dagger cam 163 being secured to the driver head 72 and extending downwardly between the bracket 42 and block 162 with the dagger face of the cam in contact with this block.

Figure 11:
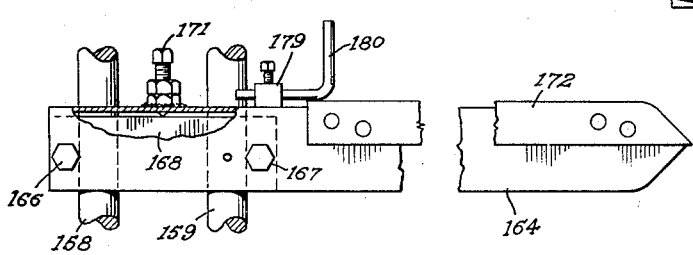
Fig. 11 is a plan view of Fig. 10 partly broken away to disclose the manner in which the clamp arms of the invention are adjusted into parallel relation.
Figure 10:
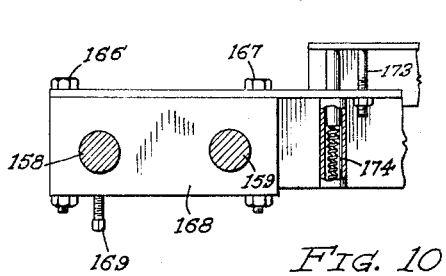
Fig. 10 is an enlarged vertical sectional view taken on the line 10—10 of Fig. 5.

Mounted on shafts 158 and 159 are outside clamp arms 164 and 165. Each of these arms is fixed by bolts 166 and 167 onto a block 168 which is bored to receive the shafts 158 and 159 (see Figs. 10 and 11).

The block 168 of the clamp arm 164 has a set screw 169 which rigidly fixes this block on the shaft 158, and the block 168 of the clamp arm 165 has a set screw 170 which rigidly fixes this block on the shaft 159. Thus, the clamp arm 164 is stationary and the clamp arm 165 is shiftable with the shaft 159 when this slides longitudinally in the bearings 45.

Each of the clamp arms 164 and 165 is provided with a set screw 171 which adjustably bears against the block 168 of this arm to determine the rotary position of this arm about the bolt 166 which extends through neat holes in these clamp arms.

The bolts 167, however, extend through lug holes in the clamp arms 164 and 165 so as to allow sufficient play to adjust these clamp arms into true parallelism before tightening the bolts 167 to rigidly unite these arms with their respective blocks 168.

Each clamp arm 164 and 165 has a vertically yieldable shook flusher 172, the uppermost position of which is determined by bolts 173 and which is yieldably held in upward position by spring units 174.

Welded on the inner faces of the clamp arms 164 and 165 are collars 179 in each of which is adjustably fixed a head stop 180, the latter comprising a rod forming a right-angled bend. As may be seen in Fig. 5, the stops 180 are in vertical alignment with the stops 151 provided on the box guides 137 and 138.

Referring now to Figs. 1, 2, 5, and 14, slat spacers 181 are mounted on the fixed shaft 158 and extend forwardly into the machine to support and space slats placed in the machine manually in proper positions for these slats to be nailed to crate heads previously placed in the machine manually. There are two of these slat spacers, each of them having a spacer bracket 182 including a clamp 183, the strap 184 of which provides a pivotal mounting for the rear end of a spacer arm 185.

This arm has dogs 186 adjustably fixed thereon at intervals along its length, these dogs forming stops for slats S placed thereagainst and resting on the arms 185.

Bracket 182 also includes a strap member 187 which extends downwardly from the clamp 183, horizontally, and then upwardly to terminate in a slotted upper end 188 through which the arm 185 extends so as to be guided thereby. A clevis headed bolt 190 is pivoted to the arm 185 and extends downwardly through a suitable hole in the strap 187. A pin 191 through this bolt traps a spring 192 between this pin and the strap 187 to yieldably support the arm 185 in an upward position, which is determined by a nut 193 on the lower extending end of the bolt 190.

The work supporting and aligning mechanism 34 also includes right and left anvil devices 195 and 196 which are reverse duplicates of each other. Each of these has a U-shaped bracket 197 with a pedestal 198 which rests upon the ties 39 and 40 and is secured thereto by bolts 199 which extend vertically through the pedestal 198, ties 39 and 40, and the strap 200.

Each bracket 197 has lugs 201 and 202 in which is journaled a shaft 203 having fixed thereto, on opposite sides of the lug 202, a collar 204 and an arm 205. Also fixed on the shaft 203 between said lugs is an anvil support 206 including a pair of arms 207 unnited at their upper ends by a post anvil bearing 208. Welded to the inner faces of of the arms 207 are tubular sockets 209 in which T-shaped box head loading guides 210 are adjustably fixed by set screws 211.

Rotatably resting in the bearing 208 is a semicylindrical post anvil 212 having post gripping teeth 213 rising from a flat face 214 thereof. The bearing 208 has a slot 215 through which a cap screw 216 extends to screw into a tapped hole in the anvil 212. This screw also extends through a washer 217 and a coiled spring 218, the latter holding the anvil 212 seated in the bearing 208 while the slot 215 permits a slight degree of rotation of this anvil in this bearing to adjust the anvil to variations in the work.

Pivoted on the shaft 203 is the hub 225 of a rail anvil support 226, the latter having slots 227 through which bolts 228 extend to adjustably secure to the support 226 a rail anvil 229. Welded to the inner face of the support 226 is a tapped jack sleeve 230 containing a jack screw 231, the head of which rests against and supports the lower edge of the anvil 229.

Figure 9:
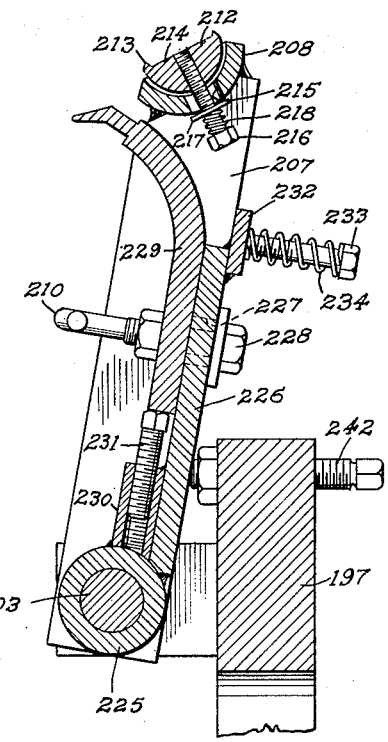
Fig. 9 is an enlarged detail vertical sectional view taken on the line 9—9 of Fig. 2 and showing the post and rail supporting anvil mechanism.

Welded to the upper ends of each of the supports 226 is a strap 232, opposite ends of which overlie the arms 207 and are apertured for screws 233 to extend therethrough and screw into tapped holes in said arms. Springs 234 are coiled about said screws between the heads thereof and strap 232 to yieldably hold the rail anvil 229 outwardly, as shown in Fig. 9.

Pivotally connected at their opposite ends to the arms 205 and to a clevis 240, provided on the lower end of the rod 131, are links 241. Stop screws 242 provided in brackets 197 limit the inward swinging of anvil supports 206.

The chuck mounting frame 77 is provided at its opposite ends with bifurcated lugs 243 which extend downwardly therefrom and pivotally connect with the upper ends of links 67 (see Fig. 1).

*Operation*

To start making crates with the machine 30, the motor 55 is energized thereby rotating the shell of the clutch 57 continually so that all that is necessary to cause a single revolution of the shaft 59 is to tromp on the foot pedal 60.

The nail feeding mechanism (not shown) is also operated by the motor 55 so that at the conclusion of each nailing operation, a nail is fed downwardly to each of the chuck nail channels 128 through one of the tubes 78.

One end of the specific crate which the disclosed embodiment is designed to make is shown in perspective in Fig. 26, this crate being designated by the letter C. This crate is made up of two identical heads H, the perimeter of each of which is formed by nailing together two rails R which have a rectangular cross section and two posts P which have a triangular cross section. Each head is completed by nailing a panel 250 on the posts P between the rails R, this panel being of thinner material and somewhat wider than the rails R. The bottom and each side of the crate is made of three slats S.

The side slats are nailed onto corresponding pairs of posts of the two heads and the bottom slats are nailed onto a corresponding pair of rails of the two heads.

As above pointed out, and as clearly shown in Fig. 26, the nails driven through the ends of slats S in securing these to rails R to form a crate bottom are nearer the ends of the slats than are the nails which are driven through these slats into the side posts of the crate to form the crate sides. This is necessary because the posts and rails overlap each other and the entire mass of the posts is disposed inwardly from the inner faces of the rails. Thus to drive nails through the side slats into the posts, these nails must lie in a plane that lies inwardly from the inner surface of the rails and this plane must therefore be a different plane from that in which the nails are driven through the bottom slats into the bottom rails of the crate heads.

Figure 14:
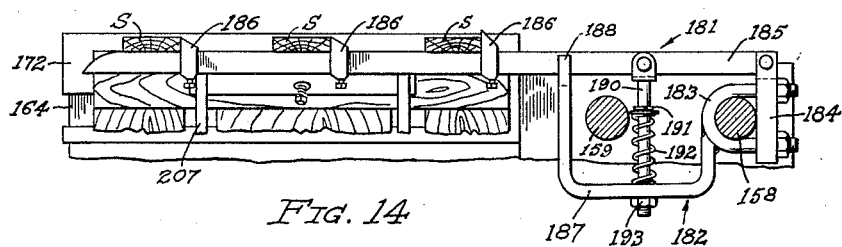
Fig. 14 is an enlarged detail sectional view taken on the line 14—14 of Figs. 5 and 15 and illustrates one of the slat spacers of the invention.
Figure 12:
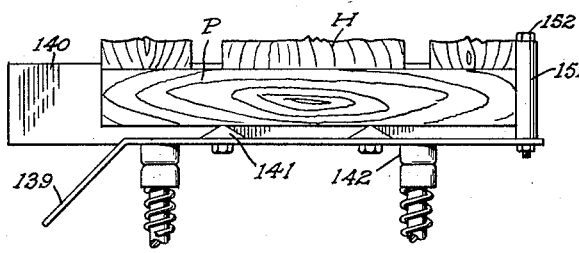
Fig. 12 is a fragmentary diagrammatic elevational view of the left-hand box guide taken on the line 12—12 of Fig. 15 and with a crate head resting on said guide during the operation of nailing the first side of the crate.
Figure 13:
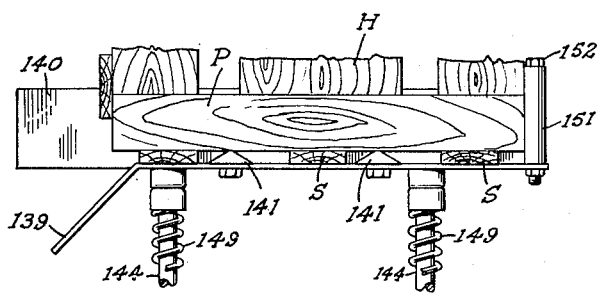
Fig. 13 is a view similar to Fig. 12 taken on the line 13—13 of Fig. 24 and illustrating the corresponding situation existing during the nailing of the second side onto the crate.

The crate heads H are prefabricated before starting to make a crate and slats and heads are stacked near the machine to make these conveniently accessible to the operator. At the start of the operation, the machine appears to the operator as shown in Fig. 1 with the motor running, and the nail feeding mechanism supplied with nails. The operator then manually inserts two heads H and three slats S in the machine as shown in Fig. 15 with the heads resting on lugs 141 of the guides 137 and 138 and pushed backwardly into contact with stops 151 and 180, the slats being distributed on the slat spacers 181 against the dogs 186 as shown in Fig. 14.

At this time, the cams 99 are turned with their lobes 106 positioned as shown in Fig. 16, which permits the banks 119 of the chucks to be held in their inwardmost positions by the spring 127.

It is to be noted that the shook flushers 172 extend above the slats S resting on the slat spacers 181 so that the slats S are disposed entirely between these flushers.

The operator now steps upon the pedal 60 causing a single revolution of the shaft 59, giving a single vertical reciprocation to the pitmans 62 and the driver head 72, to which the upper ends of these pitmans connect. During the initial part of this rotation of the shaft 59, the cams 63 turn from beneath the rollers 64 so that these cams offer no support through the links 67 to the chuck mounting frame 77. The latter frame thereupon becomes supported through the shafts 75 and nuts 260 provided thereon, by the head 72, and continues to be supported thereby in this manner until the chucks 111 come to rest on the work as shown in Fig. 17.

This occurs before the driver head 72 has completed its downward movement which therefore continues until this head arrives in the broken line position in which it is shown in Fig. 17. The punches 89, being thus extended downwardly through the chucks 111, drive nails N from these chucks into the work.

As the chuck mounting frame 77 thus moves downwardly, and before the chucks come to rest on the work, the downward movement of this frame is transmitted through the rod 131 and links 241 to the arms 205, thereby rocking the shafts 203 and swinging the anvil supports 206 outwardly until the post anvils 212 are brought snugly into supporting relation with the upper posts of the crate heads H as shown in Fig. 17. In this movement of the anvil supports 206, the rail anvils 229 contact the panels 250 of the crate heads before the post anvils 212 engage the upper posts, thereby shifting the crate heads outwardly against the flushers 172 on the clamp arms 164 and 165. These flushers have already been brought closer together by movement transmitted to the clamp arm 165 by the lowering of the dagger cam 163 as the driver head 72 started downwardly. This dagger cam accomplishes this shifting of the clamp arm 165 by wedging the block 162 outwardly to make room for the dagger cam to move downwardly past this as shown in Fig. 17.

It is to be noted in Figs. 17 and 18 that movement of the chuck frame 77 downward to the position in which it is shown in Fig. 17, produces a clock-wise rotation of the chuck index arm 101 so that the ratchet dog 102 rides over one of the teeth 105 of the ratchet 98.

Figures 19, 20:
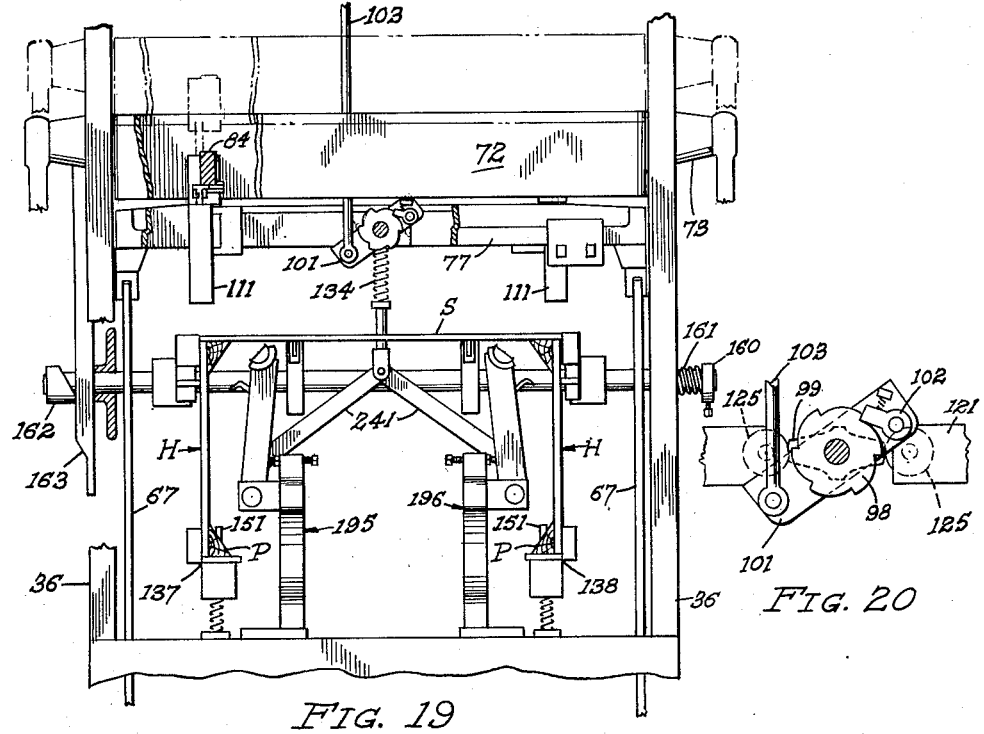
Fig. 19 is a view similar to Fig. 16 and illustrates the next step in the nailing of the slats of the initial sides onto the crate in which the chucks have lifted, thus actuating the chuck index arm to shift the two banks of chucks outwardly, this view showing, as it rises, the nail driver head in full lines, and in broken lines as it reaches its position of rest.
Fig. 20 is an enlarged view of the chuck shifting mechanism as it appears in Fig. 19.

During the concluding half of the single revolution of the shaft 59, the cams 63 lift the rollers 64 and rockers 65, and this movement is transmitted through the links 67 to the chuck mounting frame 77, causing this frame to rise in closely spaced relation with the driver head 72 (as shown in Fig. 19) until the chuck mounting frame 77 reaches its normal uppermost position, after which, the driver head 72 continues upwardly into its normal upward position where it arrives at the conclusion of the single revolution of the shaft 59.

As the chuck mounting frame 77 rises, the stationary attachment of the upper end of the rod 103 to the frame tie member 38 causes the chuck index arm 101 to be rocked back to its initial position, as shown in Fig. 20, but, in doing this, the dog 102 turns the ratchet 98 and the cams 99 one-sixth of a revolution so that the lobes of these cams are disposed in alignment with and in contact with the rollers 125, thus separating these rollers and shifting the chuck banks 110 into their maximum spaced relation as shown in Fig. 19, in readiness for nailing a bottom onto the create C.

Figure 21:
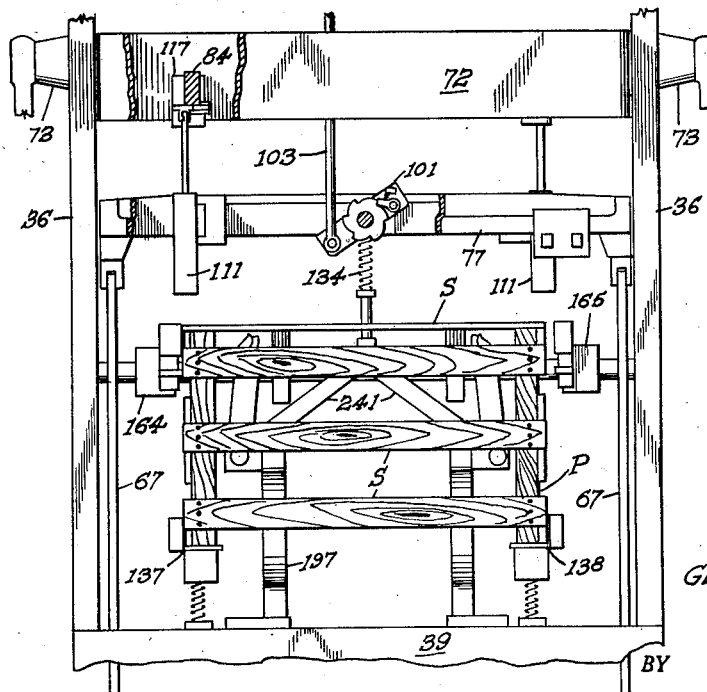
Fig. 21 is a view similar to Fig. 19 and illustrates the appearance of the work and parts of the machine at the commencing of the nailing of the bottom on the crate.

The work, comprising the two heads H and the first side which was nailed thereto in the nailing operation just described, is now freed from compression between the clamp arms by the dagger cam 163 having returned to its upwardmost position shown in Fig. 1 and is also freed from pressure from the anvil devices by the rod 131 moving upwardly with the chuck mounting frame 77 so as to swing the anvil supports 206 inwardly as these are shown in Figs. 1 and 19. Thus freed, the work is readily turned manually to the position in which it is shown in Fig. 21 with the first side facing the operator and with the bottom rails of the crate heads disposed upwardly for nailing the crate bottom thereto.

To accomplish this, three slats S are manually placed in the machine on the slat spacers 181 in the same manner as was done in preparation for nailing on the first side, above described. Owing to the chuck banks now being shifted apart into their maximum spaced relation, they are properly located for nailing the three slats just placed in the machine to the bottom rails R of the crate heads.

This nailing operation is accomplished in the same manner as was that heretofore described for nailing the first side onto the crate heads.

Fig. 22 illustrates this operation of nailing a bottom onto the crate at the moment when the driver head 72 is in its downwardmost position. Here it is shown that with the outward swinging of the anvil supports 206, the rail anvils 229 extend beneath the uppermost rails R (which of course are the bottom rails of the crate) and support these rails during the nailing operation.

Simultaneously with this positioning of the rail anvils, the post anvils 212 yieldably engage the rails of the crate heads and shift these outwardly into snug relation with the clamp arms 164 and 165. It is thus to be noted that in a nailing operation in which slats are nailed to posts, post anvils support the posts and rail anvils yieldably hold the rails against the clamp arms. On the other hand, when nailing slats onto rails as in applying the bottom to the crate, the rail anvils support the rails while the post anvils yieldably hold the crate heads outwardly against the clamp arms.

At the midpoint of the bottom nailing operation shown in Fig. 22, the chuck index arm 101 is rocked in a clock-wise direction causing the dog 102 to over-ride another tooth of the ratchet 98 so that the return of the arm 101 to its normal position (as shown in Fig. 25) rotates the ratchet 98 and the cams 99 another one-sixth turn, thus moving the lobes of the cams 99 out of alignment with the rollers 125 and allowing the chuck banks 110 to be pulled into their minimum spaced relation by the spring 127.

The chuck banks are thus brought into the proper position for nailing the second side onto the crate. Fig. 24 shows the work after being manually turned another 90° and the slats for the second side inserted in place, ready for the nailing operation. When this takes place, the ratchet 98 and cams 99 are turned another one-sixth of a revolution so that the cams 99 will have been turned 180° since the starting of the making of the crate and will have the same appearance as presented in Fig. 16.

Thus, the nailing of each bottom on the box causes the banks 110 of chucks to be shifted into their minimum spaced relation and these banks remain in this relation during the two following nailing operations in the first of which the second side is nailed onto the crate having this bottom and in the second of which the first side is nailed onto the next succeeding crate being made in the machine 30.

While but a single embodiment of the invention is shown and described herein, it is to be understood that many modifications may be made in this without departing from the spirit of the invention or the scope of the appended claims.

I claim:

1. In a crate making machine, the combination of: means for supporting crate elements in assembled relation; two banks of nail holding chucks disposed along opposite ends of the work, means for driving nails from said chucks for nailing sides and a bottom onto crate ends in a series of nailing operations; and a mechanism activated by said nail driving means for spacing said banks of chucks a given distance apart when a side is being nailed onto said crate, and a different distance apart when a bottom is being nailed thereon.

2. In a crate making machine, the combination of: means for supporting in assembled relation elements used in making a crate; a nailing mechanism including two banks of nail chucks and punches, one of which banks is disposed over each end of the work; means for actuating said nailing mechanism to drive rows of nails simultaneously from all of said chucks into said work, said nails appearing in two lines along opposite ends of said work to secure a side or a bottom to a pair of crate heads; and means responsive to a given operation of said nailing mechanism to cause relative movement between said two banks to space said banks a different distance in the next succeeding nailing operation than they were spaced in said given nailing operation.

3. In a crate making machine, the combination of: means for holding crate heads and side and bottom elements in assembled relation therewith for nailing said elements to said heads in three successive nailing operations in which the first side, the bottom, and the second side are nailed to said heads in the order named; a nailing mechanism including two banks of chucks and punches, one of which banks is disposed along each end of the work; and means responsive to the nailing of said first side to said ends to differently space said banks apart for the next succeeding nailing operation in which said bottom is nailed to said heads, and responsive to said bottom nailing operation to differently space said banks for the nailing of said second side to said heads, said bank spacing means being unaffected by said third nailing operation to change the spacing of said banks.

4. In a crate making machine, the combination of: means for holding crate heads and side and bottom elements in assembled relation therewith for nailing said elements to said heads in three successive nailing operations in which the first side, the bottom, and the second side are nailed to said heads in the order named; a nailing mechanism including two banks of chucks and punches, one of which banks is disposed along each end of the work; and means responsive to the nailing of said first side to said ends to differently space said banks apart for the next succeeding nailing operation in which said bottom is nailed to said heads, and responsive to said bottom nailing operation to differently space said banks for the nailing of said second side to said heads, said bank spacing means being unaffected by said third nailing operation to change the spacing of said banks, said bank spacing means being set by said third nailing operation in the making of said box so as to repeat its performance as aforesaid during the next succeeding series of nailing operations in the making of a second box.

5. In a machine for making crates, the heads of which are assembled to include posts and rails forming the perimeters thereof, the combination of: external flusher means for clamping said heads and side and bottom elements in proper assembled relation for nailing these together and for determining the proper spacing of said heads to produce a box of a given length; anvil means disposed within the work and shiftable laterally into supporting relation with an uppermost pair of posts or rails, depending upon whether a side or a bottom is being nailed onto said heads; a nailing mechanism for driving nails simultaneously through opposite ends of a side or a bottom into said heads to nail an entire side or an entire bottom onto said heads in a single nailing operation; and drive means causing said flusher means to clamp the work and said anvil means to be shifted into clamping and supporting relation with said uppermost post or rails, and causing said nailing means to perform a nailing operation as aforesaid, all in timed relation, and then returning said mechanisms to their inactive positions in which said work is free to be turned into the proper position for performing the next nailing operation thereon.

6. A combination as in claim 5 in which said nailing mechanism includes two banks of chucks and punches, each of which is disposed along one of the opposite ends of the work; and means operable by said drive mechanism during a given nailing operation to cause relative movement between said banks of chucks to cause these banks to be spaced apart a different distance in a succeeding nailing operation.

7. A combination as in claim 5 in which said anvil means includes a pair of U-shaped brackets laying on their sides, supports pivoted on upwardly disposed portions of said brackets, and post and rail anvils on upper portions of said supports; and means actuated by said drive means for rocking said supports to bring said anvils into supporting relation with said posts or rails.

8. A combination as in claim 5 in which said anvil means comprise half-round bars with semicylindrical faces and approximately flat post gripping faces, bearings for rotatably supporting said bars to accommodate said anti-friction faces to flat angular faces of said posts, shiftable bearing supports and rail anvils yieldably mounted on said supports, said post anvils engaging a pair of rails, when the latter is uppermost, to hold said crate heads against said flusher means when said rails are supported by said rail anvils during a nailing operation, said rail anvils yielding, however, when in engagement with said box heads when a pair of posts are uppermost to permit said post anvils to come into close supporting relation with said posts.

9. In a semi-automatic crate making machine, the combination of: shiftable anvil means for alternately moving from within the work into supporting relation with a pair of bevelled posts and with a pair of rectangular rails of prefabricated crate heads; external flushing means; means for nailing slats onto said heads; and power means to actuate the aforesaid three means in timed relation to shift said anvil means into one of said supporting relations, to nail a side or bottom on said heads, to return said three means to neutral retracted positions, and then to automatically stop.

GLENN E. STILWELL.

REFERENCES CITED

The following references are of record in the file of this patent:

UNITED STATES PATENTS

| Number | Name | Date |
|---|---|---|
| 1,007,234 | Parker | Oct. 31, 1911 |

Certificate of Correction

Patent No. 2,511,020                                                                       June 13, 1950

GLENN E. STILWELL

It is hereby certified that error appears in the printed specification of the above numbered patent requiring correction as follows:

Column 10, line 61, for the word "activated" read *actuated*; column 12, line 32, for "anti-friction" read *post gripping*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*